(12) United States Patent
Yu et al.

(10) Patent No.: US 6,455,615 B2
(45) Date of Patent: Sep. 24, 2002

(54) FLEXIBLE POLYMER MODIFIED CEMENT-BASED WATERPROOFING MATERIALS AND THEIR MAKING PROCESS

(75) Inventors: Ji Guang Yu; Dong Xia; Lei Zhu; Yu Qing Guo; Peng Chen, all of Tianjing (CN)

(73) Assignee: Tianjin Building Materials Science Research Institute, Tianjin (CN)

( * ) Notice: Subject to any disclaimer, the term of this patent is extended or adjusted under 35 U.S.C. 154(b) by 0 days.

(21) Appl. No.: 09/759,647

(22) Filed: Jan. 12, 2001

(30) Foreign Application Priority Data

Jan. 12, 2000 (WO) ............................... PCT/CN00/00005

(51) Int. Cl.⁷ ........................... C08K 3/00; B29C 67/00
(52) U.S. Cl. .................... 524/5; 524/7; 524/8; 264/175
(58) Field of Search .............................. 264/175; 524/2, 524/3, 4, 5, 6, 7, 8

(56) References Cited

U.S. PATENT DOCUMENTS

| 2,066,550 | A | * | 1/1937 | Batcheller | 264/175 |
|---|---|---|---|---|---|
| 4,249,950 | A | * | 2/1981 | Hurst | 524/8 |
| 5,582,670 | A | * | 12/1996 | Andersen et al. | 264/175 |
| 5,814,146 | A | * | 9/1998 | Maggio et al. | 264/175 |

FOREIGN PATENT DOCUMENTS

| CN | 1089984 | 7/1994 |
|---|---|---|
| CN | 2340608 U | 9/1999 |
| JP | 60005053 | 1/1985 |
| JP | 2167956 | 6/1990 |

OTHER PUBLICATIONS

Grant & Hackh's Chemical Dictionary, Fifth Edition McGraw–Hill, p. 619, 1987.*

* cited by examiner

*Primary Examiner*—Peter Szekely
(74) *Attorney, Agent, or Firm*—Jenkens & Gilchrist

(57) ABSTRACT

This invention provides a flexible polymer modified waterproofing cement material which can be used on a substrate or in concealed areas of construction engineering, water conservancy projects, municipal works, and its making process. The waterproofing material is made by kneading a hydraulic cement, a polymer dispersion, a water-soluble polymer or re-dispersible resin and water at a weight ratio of cement/polymer of about 100:15 to about 100:150 under conditions of about 25° C. to about 120° C., about 20 rpm to about 80 rpm until the water content of the kneaded materials reaches about 5% to about 20%. The kneaded material is mixed with a toughening polymer at a weight ratio of about 100:10 to about 100:50, then is calendered into sheets. These materials can adhere to dry or wet substrates firmly. They can be used in cold or hot and wet climate areas. After application, the waterproofing structure formed can bear retractive stress and deformation of the base or can resist outer impact.

20 Claims, No Drawings

FLEXIBLE POLYMER MODIFIED CEMENT-BASED WATERPROOFING MATERIALS AND THEIR MAKING PROCESS

PRIOR RELATED APPLICATIONS

This application claims priority to previously filed International patent application No. PCT/CN00/0005, filed Jan. 12, 2000.

FIELD OF THE INVENTION

This invention relates to waterproofing materials used in construction engineering, water conservancy projects, municipal works, etc., and their manufacturing processes, especially to cement-based waterproofing materials and their manufacturing processes.

BACKGROUND OF THE INVENTION

In recent years, cement-based waterproofing materials experienced fast development and formed several product lines, such as polymer modified cement-based waterproofing membranes, rigid polymer modified cement (dry mix) waterproofing mortars, etc., among which the rigid polymer modified cement waterproofing material is the main product. The rigid waterproofing materials are modified by adding an organic polymer, a waterproofing admixture, a water reducer, and an expansion admixture to reduce and compensate for cement shrinkage, to prevent cracking, to reduce and refine the capillary pores of the materials, and to make the concrete denser and improve the impermeability remarkably. Although these materials have good aging resistance, they cannot accomodate extensive deformation of the base because of their rigidity. If dry shrinkage or expansion and contraction due to temperature changes lead to cracking of the base layer, the waterproofing layer may also crack or delaminate which will affect the waterproofing performance. Their application will be limited greatly, and they cannot be applied to large-area waterproofing engineering of floors and roofs.

In recent years, a paint with a high ratio of polymer/cement (which is about 50% by weight or higher and even up to about 100% by weight) is used as a liquid-applied membrane waterproofing material which is widely used in apartments, basements, underground water tank, etc., in Japan, Germany and some areas of China. However it needs mixing and stirring on site, and its one coating layer is thin due to the high ratios of polymer/cement and water/cement. Thus, the painted waterproofing materials need multiple coating procedures, and therefore more time and manpower are needed.

SUMMARY OF THE INVENTION

Because of the better durability and less environmental pollution during their production and application, cement-based waterproofing materials can be widely used on different base materials and are very convenient in application. A great deal of effort has been put into the studying and comparing of these materials. By improving the formulation and the production process, a polymer modified cement material with a lower ratio of polymer/cement and water/cement evenly mixed and dispersed under the impact of temperatures and high shear force can be made. It combines the advantages of a rigid cement waterproofing material with those of a flexible waterproofing material (such as rubber and plastic). Using a calendering process, a flexible cement-based waterproofing material with a denser structure, better waterproofing performance, excellent durability, and capable of accommodating deformation of the base can be obtained. Flexible is defined as capable of being bent or flexed (pliable) and further defined as being capable of being bent repeatedly without injury or damage, see *The American Heritage® Dictionary of the English Language* (4th ed., Boston, Houghton Mifflin, 2000).

An object the invention is to provide a process for making a flexible cement-based waterproofing material and the waterproofing materials prepared by the process.

Embodiments of the invention provide a waterproofing material, which can be used in inner, outer or concealed areas of civil engineering construction. This material can be adhered to various cement-based materials and can be used on wet surfaces during construction. Considering the advantages of the cement-based waterproofing material, the material provided in this invention is mainly cement materials.

To provide the cement-based waterproofing material, the cement material in this invention is modified by polymer dispersions, further toughened by polymers, using the processes of kneading, mixing and calendering.

The invention provides a process for making a cement-based waterproofing material, which may include one or more of the following steps:

(a) kneading a hydraulic cement and a polymer dispersion, a water-soluble polymer or a re-dispersible powder resin, or a blend thereof with water at a weight ratio of cement/polymer of 100:15–150 under conditions of about 25° C. to about 120° C., about 20 rpm to about 80 rpm, until the water content of the kneaded material reaches about 5 wt. % to about 20 wt %;

(b) mixing the kneaded material with a toughening polymer at a weight ratio of about 100:10 to about 100:50 and at a temperature of about 40° C. to about 85° C.; and (c) rolling the resulting composition into sheets; wherein the toughening polymer is selected from rubber, thermoplastic elastomer, thermoplastic resin, or a mixture thereof.

The invention also provides a flexible cement-based waterproofing material produced by the above mentioned process. The preparation process in accordance with embodiments of the invention is described in detail in the following.

DESCRIPTION OF EMBODIMENTS OF THE INVENTION

1. Making of the Kneaded Material

In the method of this invention, the raw materials for making a kneaded material are mainly a hydraulic cement and polymers used as a modifier, the weight ratio is about 100:15 to about 100:150.

In the above raw materials, the cement should be a hydraulic cement, which may be selected from ordinary Portland cement, aluminum sulphoaluminate cement, calcium alumino ferrite cement, low alkali cement, aluminous cement, and white cement. Any of the aforementioned raw materials or a mixture thereof, or about 20% to about 50% by weight of the cement can be replaced by an equal quantity of potential hydraulic binder materials. The quantities replaced are decided according to the fineness and variety of the materials. Generally, the replacing materials are fly ash, silica fume, volcanic ash, zeolite powder, metakaolin, slag, calcium-increased liquid slag, phosphorus slag. etc. The fineness should preferably be greater than or equal to 300 $m^2/kg$.

The polymers used as modifiers should meet the requirements for processing performance of the cement-based waterproofing materials and the requirements for material characteristics. They should preferably have one or more of the following advantages:

a. higher filler binding capacity;
b. good flexibility or high elasticity at application temperatures;
c. excellent anti-ultraviolet ray performance and good durability;
d. good "breathing" capability and chemicals resistance; and
e. favorable film forming temperatures and water resistance.

Any polymers that meet the above criteria can be used, for example, polymer dispersions, water-soluble polymers or re-dispersible powder resins, etc. Preferably the polymer used includes, but is not limited to, polyacrylate latex, EVA (polyethylene-vinylacetate) latex, styrene-butadiene rubber latex, chloroprene rubber latex, poly(vinyl acetate - Vinyl Versatate) latex, vinyl chloride-vinylidene chloride copolymer latex, poly(vinyl chloride-vinylacetate-acrylate) latex, polyvinyl acetate latex and re-dispersible resin powder, etc. According to the different application requirements, one may select one or more blended polymers which have suitable glass transition temperature, such as polyacrylic latex, PS9317, $T_g=-40°$ C.; S400; $T_g=-7°$ C.; BA163, $T_g=-7°$ C.; P2438, $T_g=-22°$ C.; EVA, $T_g=7°$ C. Vinyl Versatate is a vinyl ester of Versatic acid, a synthetic saturated monocarboxylic acid of highly branched structure containing nine, ten or eleven carbon atoms.

The cement used is preferably a hydraulic gelatinous material. Through modification, the cement is hydrated and mixed with a polymer film so that the characteristics of the kneaded materials, such as waterproofing, processing and further toughening, are improved.

To further improve the kneading effect and obtain better dispersing properties, the above kneaded raw material may contain about 0.5% to about 2% of a dispersing agent by weight. The dispersing agent is selected from the condensed compounds of naphthalenesulphonate formaldehyde, sulphonate of melamine formaldehyde condensed compounds, lignin sulphonate, poly-carboxylic acid or a mixture thereof.

To enhance their tear resistance, alkali-resistant short fibers, such as polyvinyl alcohol (Vinylon) fibers, alkaline resistant glass fibers, nylon, polypropylene, carbon fibers, asbestos, and wollastonite (their weight ratio to cement is about 0.4% to about 1.5%.) can also be added.

The above kneaded raw materials can also contain about 0.4 wt. % to about 1.5 wt. % of a lubricating agent and about 2% to about 10% of a stabilizing agent by weight. The lubricating agent is used to decrease the resistance during manufacturing and to prevent sticking. The stabilizing agent can improve the high temperature resistance of the polymer under special making and using conditions. The lubricating agent and stabilizing agent can be a liquid or solid, such as polyethylene with low molecular weight, paraffin wax, stearate, etc. which can lubricate and stabilize cement particles and the polymer during their processing.

During modification, the degree of hydration of a cement is dependent on the ratio of polymer/cement, the ratio of water/cement, the processing temperature, and stirring time. The quality of the modified cement materials may be greatly affected by the time, the temperature, and the way of stirring, which directly affect the cement hydration and re-processing performances. The materials are kneaded at a stirring speed of about 20 rpm to about 80 rpm, and a temperature of about 25° C. to about 120° C., preferably at about 60° C. to about 120° C. and about 40 rpm to about 80 rpm.

By modification, the particles of the polymer, which is used as modifier, are preferably evenly adhered to the surface of the cement gel and particles. A three-dimensional network is formed in which the elastic film and the cement hydration product interpenetrates, which may greatly enhance the mechanics and waterproofing performance, and renders the cement materials more cohesive and hydrophobic surface that is favorable for further toughening and processing.

The raw materials for making kneaded materials can also include aids and fillers. The aids include water reducing agents used to reduce the requirement for water, dispersing agents and surface activators used to disperse and stabilize cement and emulsions, such as low molecular weight polyacrylic acid, alkyl aryl polyoxyethylene ester, etc. Their weight ratio is less than about 1 wt. % of the material. The fillers are non-hydraulic, natural or compound materials, such as quartz sand, limestone, talcum, precipitated calcium carbonate and ground calcium carbonate, etc. Their weight ratio is less than about 10% of the cement.

When kneading the above raw materials, the polymer and water are added into the cement and mineral admixtures. The material is mixed evenly by stirring and becomes a polymer cement paste with good flowability. The polymer particles are evenly dispersed in the cement and mineral admixtures. At a temperature of about 25° C. to about 120° C., preferable about 60° C. to about 120° C., under the impact of heat and shear force, the cement is hydrated quickly. In this process, some water is combined with the cement and becomes the cement hydration products. Some water becomes volatile water which evaporates quickly. As the water content is reduced, the particles of the polymer can coalesce with each other and together with the melted lubricating aids and evenly envelops the surface of the cement particles. They firmly combine with each other to form sticky, elastic, adhesive and tough polymer film interpenetrating the pores of the cement frame. Under the impact of shear force, heat, and dewatering, the material become cement kneaded material and is ready for use.

The kneaded material can be stored for several days at room temperature without any performance loss.

2. Mixing

The polymer modified kneaded material is mixed with a toughening polymer at a weight ratio of about 100:15 to about 100:50, along with suitable aids.

A study has shown that a toughening polymer such as rubber, thermoplastic elastomer, thermoplastic resin and a blend of the rubbers and plastics can further increase the toughness of the cement-based waterproofing sheet to render the sheet ductile at the temperature of about −40° C. to about 80° C. The materials can withstand deformation and keep proper waterproofing properties in various applications. The toughening polymer preferably should maintain toughness or high elasticity at application temperatures and good erosion resistance, durability, water resistance, high strength and greater elongation. Preferred toughening polymers include, but are not limited to, butyl rubber, ethylene propylene diene monomer terpolymer (EPDM), butadiene styrene rubber, chloroprene rubber, natural rubber, chlorinated polyethylene (CPE), chlorosulphonated polyethylene (CSPE), styrene-butadiene-styrene block co-polymer (SBS), atactic polypropylene (APP), polyolefin resin, chlorinated polyvinylchloride, polyethylene, polyvinyl chloride and their reclaimed resources or a mixture thereof.

Mixing on a mix mill is carried out at a temperature of about 40° C. to about 85° C. After plastication is done evenly, the materials are unloaded and cooled to room temperature. If colored products are desired, dyestuffs and pigments (such as iron oxide red) may be added into the materials while mixing to make colored sheets with waterproofing and decorative appearance.

3. Calendering

The materials prepared by the above processes are warmed on an open mill. When the plasticity of the material reaches a certain level, it is calendered into sheets. They can be made into sheets or rolled materials of different specifications according to the requirement of different projects. If necessary, use of reinforcement on both sides or in the middle during rolling to enhance the tensile strength and tear resistance of the sheet improves the application performances.

The reinforcement can be alkali-free or alkali-resistant glass fiber non-woven fabrics, textile cloth and latticed cloth, chemical fiber non-woven fabrics or textile cloth, plant fiber textile cloth, or woolen cloth.

This invention also provides a cement-base waterproofing material prepared by the above process.

Tests show that the tensile strength of the sheet processed by the above-mentioned process is about 1.5 MPa to about 7 MPa, and its elongation is about 80% to about 240%, the tear-resistance strength is about 200 N/cm to about 300 N/cm, water impermeability is impermeable under the condition of about 0.3 MPa for 90 minutes, low temperature flexibility is to the extent that there is no cracking after being wrapped around a stick of about 10 mm in diameter for about 30 minutes at about −20° C., and better aging resistance. The retention ratio of tensile strength and elongation is higher than about 80% after about 80±20° C., about 168 aging hours. To adhere the sheet onto a substrate using a low polymer/cement ratio mortar, the peel strength after 28 days is about 25N/25 mm. To stick the sheets to sheets by a cement mortar of a higher polymer/cement ratio, the peel strength of the lap seam after 28 days is about 30N/25 mm.

The cement-based waterproofing materials prepared by this method can be classified into two catagories. They are waterproofing materials with or without reinforcement.

The installation of the waterproofing sheet of this invention on a floor and a roof is easy and without any special requirements to the surface of the cement-based substrate. The operation is simply to trowel the polymer cement mortar (such as Ocean Rock series dry mix cement mortar) to a hardened cement-based substrate, then pave the sheet on the substrate and press them tightly.

The waterproofing materials in this invention are black or colored polymer modified waterproofing sheets. Their thickness and width can be changed according to project requirements. Tests show that, when compared to the other cement-based waterproofing products, the sustainability of the wet strength of the materials is excellent. The materials also have excellent performance, such as low water-absorptivity, good permeability resistance, freezing resistance and aging resistance. They can also be used on wet surfaces. They have a relatively long service life, a short application period and are easy to apply. The product is an environmentally friendly waterproofing material.

The waterproofing materials of this invention have good low-temperature flexibility at a temperature of about −20° C. They are suitable for applying in cold areas. They can also be used in high temperature areas. Their dimension variation up to about 80° C. is less than about 2.5%. They are applicable in construction on wet substrates. Therefore, the waterproofing materials of this invention are applicable in a wide range of areas and can be used in various conditions, have less limitations and can be popularized.

The cement-based waterproofing materials provided in this invention are preferably delivered in sheet forms. The tests show that their water impermeability performance is about 0.3 MPa, 90 minutes, tensile strength is about 1.5 MPa to about 7 MPa, elongation is about 80% to about 240%, low temperature flexibility is about −20° C.

The waterproofing materials provided by this invention are preferably cement-based waterproofing sheets. The adhesion agent used is a polymer modified cement mortar. These materials are applicable in construction on dry or wet substrates, which solves the problems occurring in the ordinary materials that cannot be used or would bring unsatisfied results in construction on wet substrates.

The waterproofing structures formed by the waterproofing materials of the invention can either bear retractive stress from downward to upward and deformation of the base or can resist outer impact.

From the viewpoint of environment protection, the raw materials selected in this invention are pollution-free generated reaction-type materials with good process stability, such as cement, mineral admixtures, polyacrylic latex or butyl rubber or their reclaimed materials, etc. During production, the waterproofing materials of this invention do not produce waste gas, waste water or waste residues. The application method is wet cold application. The binder used in installation is an aqueous material without volatile poisonous materials. This material avoids further environmental pollution. Therefore, the waterproofing materials of this invention are environmentally friendly "green" products.

The examples below illustrate some embodiments of the invention in detail.

PREFERRED PROCESS TO IMPLEMENT THE INVENTION

Embodiment Examples 1-3

1. To prepare the polymer modified kneaded material

| Formulation Number<br>Material Name | 1<br>Weight ratio | 2<br>Weight ratio |
|---|---|---|
| Ordinary Portland 525 cement (Tinajin Cement Plant) | 62.50 | — |
| White cement (Deyuan Cement Plant) | — | 93.75 |
| Mineral admixtures (Tianjin Building Material Science Research Institute) | 31.25 | — |
| Talcum powder (Haicheng Yinquan Construction Material Plant) | 6.25 | 6.25 |
| High range water-reducing agent UNF-5 (sulphonated naphthalene formaldehyde condensates) (Tianjin Yongyang Water-reducing Agent Plant) | 0.50 | — |
| High range water-reducing agent SMAH (polycarboxylate) (Tianjin Building Material Science Research Institute) | — | 0.50 |
| paraffin wax (Tianjin No.1 Petroleum Chemical Plant) | 0.50 | 0.50 |
| Polyacrylic ester latex S400 (BAFS) | 50.00 | — |

-continued

| Formulation Number<br>Material Name | 1<br>Weight ratio | 2<br>Weight ratio |
|---|---|---|
| Polyacrylic ester latex BA163 (Beijing Dongfang Chemical Plant) | — | 25.00 |
| butadiene styrene 50-50 (Lanzhou Petroleum Chemical Plant) | — | 25.00 |
| Polyoxyethylene alkyl phenol OP-10 (Tianjin Chemical Aids Plant) | 1.00 | 1.00 |
| Short Vinylon (polyvinyl alcohol) Fiber (Shanxi Vinylon Plant) | 1.50 | 1.50 |
| Jingxi (Beijing-tin) L-108 (di-N-octyltin dilaurate) (Beijing No.3 Chemical Plant) | 5.00 | — |
| stearic acid barium (Shijiazhuang Syter Chemical Co. Ltd.) | — | 5.00 |
| water in total | 27 | 27.6 |

(1) Place the above cement, mineral admixtures, filler, water-reducing agent, paraffin wax, etc. into a mixer and mix the mixture at a stirring speed of about 60 rpm;

(2) mix an emulsion with aids, reinforce fibers and water;

(3) pour the diluted emulsion into the mixer slowly, and stir and let the blended materials of (1) homogeneously dispersed in the emulsion and form a flowing cement paste.

(4) Raise the temperature after adding a stabilizing agent. The temperature reaches to about 60° C. and about 80° C. respectively. The materials are hydrated and then dewatered. Test the weight loss of the kneaded materials after placing them at a constant temperature of about 100±2° C. for about 2½ hours, and then measure the water content ratio. The water content ratio should be around about 10 percent (10%).

(5) When the water content ratio meets the requirement, unload the material and let it cool down, and the material is ready for use.

2. Mixing

| Number of implemented examples | 1 | 2 | 3 |
|---|---|---|---|
| the kneaded material 1 | 100 | — | 100 |
| the kneaded material 2 | — | 100 | — |
| butyl reclaimed rubber (Tianjin Capsule Plant) | 50 | — | 30 |
| Chlorinated polyethylene (Shandong Weifang Chemical Plant) | — | 25 | 10 |
| stearic acid (Shijiazhuang Syter Chemical Co. Ltd.) | 0.5 | 0.5 | 0.3 |
| paraffin wax (Tianjin No.1 Petroleum Chemical Plant) | 0.1 | 0.1 | 0.1 |
| Di-octyl phthalate DOP (plasticizer) (Tianjin solvent plant) | — | 10 | — |
| pigment and dye stuff | — | 7 | — |

Place the materials on a mixing mill, at temperatures of about 60° C., about 60° C. and about 85° C. respectively. When the materials are mixed evenly, unload them and let them cool down to room temperature.

3. Calendering

Warm up the cooled mixtures on an open mill. The temperature of the roller is about 49° C. to about 55° C., about 54° C. to about 74° C., about 56° C. to about 63° C. respectively, the mixture temperature is about 76° C., about 59° C. and about 65° C. respectively. When the mixtures reach certain plasticity, it is fed to the calender to be shaped. The temperature of the top, middle and bottom rollers of the calender is about 45° C., about 50° C. and about 41° C., or about 48° C., about 53° C. and about 41° C., or about 54° C., about 63° C. and about 40° C. respectively. The thickness of the sheets (1–3) is about 1.2 mm, about 1.0 mm, about 1.5 mm respectively. The width of the sheets (1–3) is about 900 mm, about 1000 mm, about 1000 mm respectively.

Embodiment Examples 4-6

Add polypropylene non-woven fabrics as reinforcement to the mixture of examples 1–3 in the calender (Fushun Xinyuan Chemical Textile Co. Ltd.). The obtained sheets of examples 4–6 are about 2.4 mm, about 1.1 mm and about 1.6 mm respectively in thickness, about 900 mm in width. The polypropylene non-woven fabric has good erosion resistance, aging resistance and weatherability and higher mechanics performance, and therefore improving the integrated mechanics performance of the sheet, which is greater than or equal to about 130N/5 cm×20 cm.

Embodiment Examples 7-9

Use the mixture of examples 1–3 on both sides of the latticed glass fiber cloth (Qinhuang dao glass fiber plant) in the calendering. The achieved sheets of examples 7–9 are about 2.4 mm, about 3 mm and about 3.6 mm in thickness respectively, about 900 mm in width. These sheets have higher mechanics performance, which is greater than or equal to 500N/5 cm×20 cm. They can be used as geomembranes in water conservancy projects and municipal works.

Representative performance characteristics of materials 1–9 are listed in the table below:

TABLE 1

| Varieties | Test items numbers | Tensile strength (MPa) | Elongation at break (%) | Low temperature flexibility (−20° C., 30 mm) | Impermeability (0.3 MPa, 90 min) |
|---|---|---|---|---|---|
| Non-reinforcement | example 1 | 1.74 | 96 | no crackle | permeation free |
|  | example 2 | 5.46 | 210 | no crackle | permeation free |
|  | example 3 | 2.42 | 132 | no crackle | permeation free |
| Reinforced with polypropylene non-woven | example 4 | 2.98 | 128 | no crackle | permeation free |
|  | example 5 | 7.34 | 144 | no crackle | permeation free |
|  | example 6 | 3.02 | 136 | no crackle | permeation free |

TABLE 1-continued

| Varieties | Test items numbers | Tensile strength (MPa) | Elongation at break (%) | Low temperature flexibility (−20° C., 30 mm) | Impermeability (0.3 MPa, 90 min) |
|---|---|---|---|---|---|
| Reinforced with glass fiber lattice | example 7 | 572* | — | no crackle | permeation free |
| | example 8 | 620* | — | no crackle | permeation free |
| | example 9 | 643* | — | no crackle | permeation free |

Note: 1.
*The unit is N/5 cm × 20 cm.

2. The testing varieties 1–9 relate to examples 1–9.

Applications

The process provided in this invention can be applied in industrial production. These products are applicable to waterproofing treatments in construction engineering, water conservancy project and municipal works, etc.

What is claimed is:

1. A method for making a cementitious waterproofing material, comprising:

kneading a hydraulic cement, a polymer dispersion, a water-soluble polymer, a re-dispersible powder resin, or a mixture thereof with water to obtain a kneaded material at a weight ratio of cement to polymer in the range of about 100:15 to about 100:150 under conditions of about 25° C. to about 120° C., and about 20 rpm to about 80 rpm until the water content of the kneaded material reaches about 5% to about 20%, mixing the kneaded material with a toughening polymer at a weight ratio of kneaded material to toughening polymer in the range of about 100:10 to about 100:50 at a temperature of about 40° C. to about 85° C. to enhance its toughness; and calendering the resulting composition into sheets, wherein the toughening polymer is one of rubber, thermoplastic elastomer, thermoplastic resin or combination thereof.

2. The method of claim 1, wherein the polymer dispersion includes one of polyacrylate latex, EVA (polyethylene-vinylacetate) latex, styrene-butadiene rubber latex, chloroprene rubber latex, vinyl chloride-vinylidene chloride copolymer latex, poly(vinyl chloride-vinylacetate-acrylate) latex, polyvinyl acetate latex, or a mixture thereof.

3. The method of claim 1, wherein the toughening polymer is selected from butyl rubber, chloride polyethylene (CPE), chlorosulphonated polyethylene (CSPE), ethylene propylene diene monomer terpolymer rubber (EPDM), styrene-butadiene-styrene block co-polymer (SBS), atactic polypropylene (APP), or one of their reclaimed resources or a mixture thereof.

4. The method of claim 1, wherein the kneading is conducted at a temperature of about 60° C. to about 100° C., and at a stirring speed of about 20 rpm to about 80 rpm.

5. The method of claim 1, wherein the kneading material further includes about 0.2 wt. % to about 2 wt. % of a dispersing agent selected from a condensed compound of naphthalenesulphonate formaldehyde, a sulphonate of melamine formaldehyde condensed compound, lignin sulphonate, poly-carboxylic acid, or a mixture thereof.

6. The method of claim 1, wherein the kneading material further includes about a 0.4 wt. % to about 1.5 wt. % of a reinforcing fiber.

7. The method of claim 1, wherein about 20 wt. % to about 50 wt. % of the hydraulic cement is replaced by an equal quantity of a mineral admixture selected from fly ash, silica fume, volcanic ash, zeolite powder, metakaolin, slag, calcium-increased liquid slag, phosphorus slag or a mixture thereof.

8. The method of claim 1, wherein the kneading material further includes about 0.5 wt. % to about 1.5 wt. % of a lubricating agent and about 2 wt. % to about 10 wt. % of a stabilizing agent.

9. The method of claim 1, the calendered sheets are with reinforcement.

10. The method of claim 1, wherein the calendered sheets are without reinforcement.

11. A cementitious waterproofing material obtained by the method of claim 1.

12. A cementitious waterproofing material obtained by the method of claim 2.

13. A cementitious waterproofing material obtained by the method of claim 3.

14. A cementitious waterproofing material obtained by the method of claim 4.

15. A cementitious waterproofing material obtained by the method of claim 5.

16. A cementitious waterproofing material obtained by the method of claim 6.

17. A cementitious waterproofing material obtained by the method of claim 7.

18. A cementitious waterproofing material obtained by the method of claim 8.

19. A cementitious waterproofing material obtained by the method of claim 9.

20. A cementitious waterproofing material obtained by the method of claim 10.

* * * * *